Figure 1:
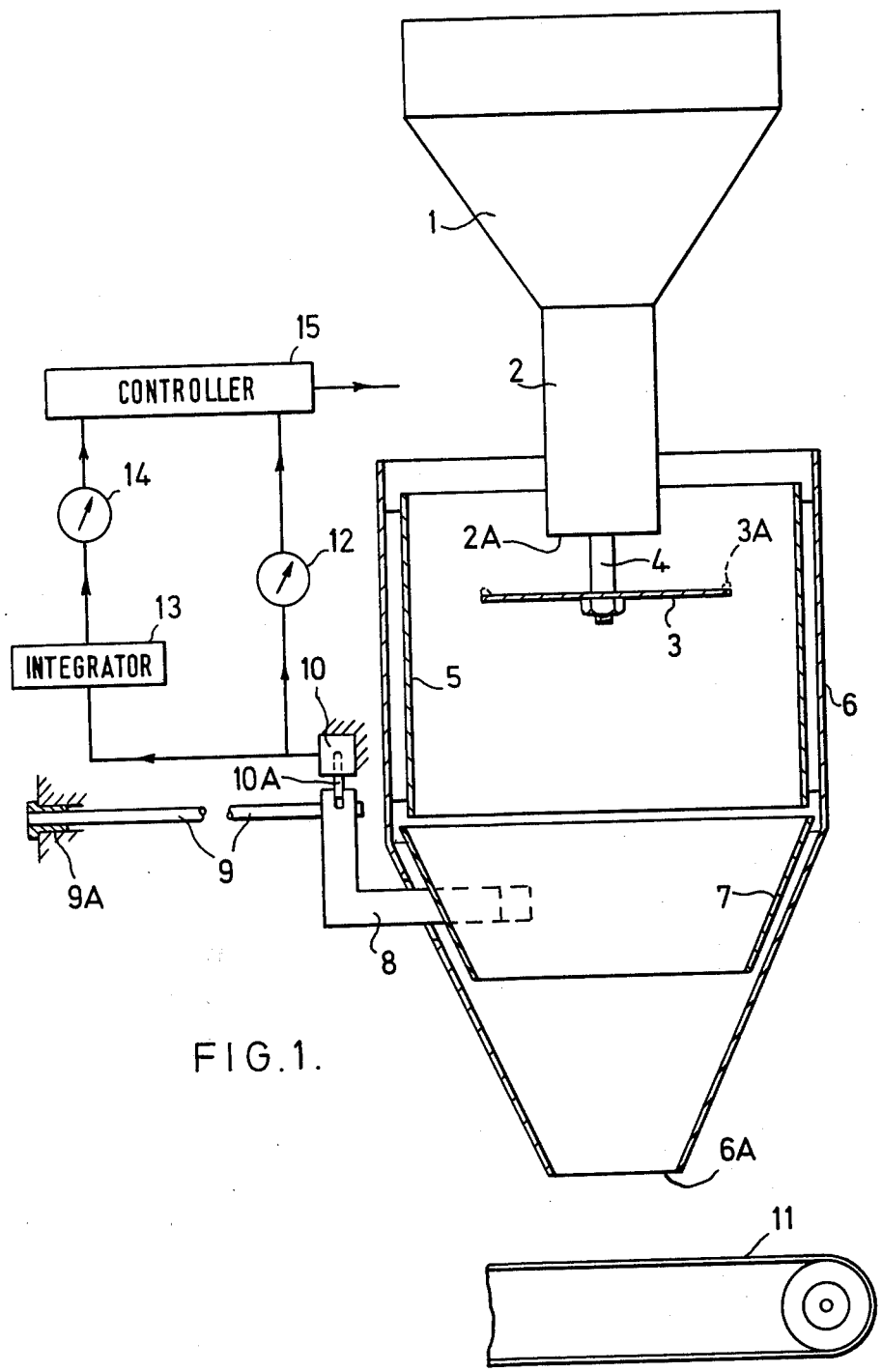

United States Patent [19]

Marks

[11] 3,945,532

[45] Mar. 23, 1976

[54] METERING DEVICE FOR FLOWABLE MATERIALS
[75] Inventor: David Alex Marks, Colmworth, England
[73] Assignee: Transmatic Fyllan Limited, Bedford, England
[22] Filed: May 24, 1974
[21] Appl. No.: 473,175

[30] Foreign Application Priority Data
May 29, 1973 United Kingdom............... 25384/73

[52] U.S. Cl..................................... 222/55; 73/228
[51] Int. Cl.² ......................................... B67D 5/14
[58] Field of Search ................ 222/55, 410, 14, 17; 73/228

[56] References Cited
UNITED STATES PATENTS

| | | | |
|---|---|---|---|
| 764,705 | 7/1904 | Bousser | 222/55 |
| 771,764 | 10/1904 | Bousser | 222/55 |
| 1,026,507 | 5/1912 | Hays et al. | 222/410 X |
| 1,558,668 | 10/1925 | Carter | 222/55 |
| 1,560,800 | 11/1925 | Hoberecht | 222/410 X |
| 2,047,203 | 7/1936 | Henson | 222/55 X |
| 2,468,712 | 4/1949 | Kohler | 214/17.64 X |
| 2,534,442 | 12/1950 | Harvey | 222/410 X |
| 3,056,293 | 10/1962 | Ofner | 73/228 X |
| 3,640,136 | 2/1972 | Nolte | 73/228 |

Primary Examiner—Robert B. Reeves
Assistant Examiner—Hadd Lane
Attorney, Agent, or Firm—Blair & Brown

[57] ABSTRACT

A metering and dispensing device for flowable materials of the type in which material is caused to flow onto a metering element in such manner as to impose thereupon a force which is a function of the rate of mass flow of the material and by detecting a component of such force a signal representing the rate of mass flow is provided. A rotary element is provided upstream of the metering element from which material is centrifugally ejected to be intercepted by baffle means causing the material to flow by gravity onto the metering element. Such structure establishes the energy condition of the material prior to deposition upon the metering element and defines the path followed by material flowing to said element.

6 Claims, 2 Drawing Figures

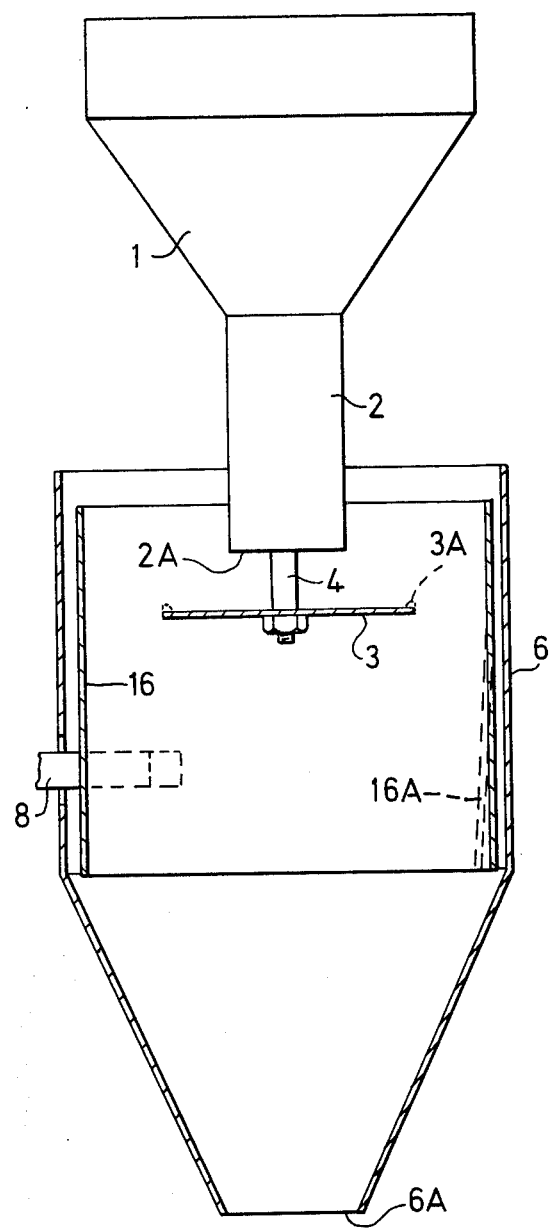
FIG. 2.
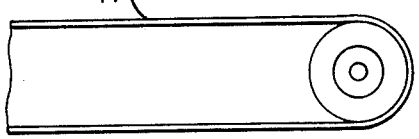

METERING DEVICE FOR FLOWABLE MATERIALS

This invention relates to a metering device for flowable materials which are, for example, dispensed at a rate which is required to be known, or which can be controlled, or which is in terms of intermittent or 'dose' dispensing such as the supply of successive measured quantities of material into separate receptacles. Materials with which the invention is concerned must be flowable, thus they may be free-flowing solids in particulate form, (such as grain, salt, granulated sugar); or non-adhesive liquids; and the invention in some forms may also be tolerant of materials which have a tendency to arch or stick (such as flour or powdered sugar).

The invention seeks to provide a metering device for the kind of purpose indicated above, which although useful as a pure meter giving indications of rates of mass flow or of total mass flow, is particularly useful when combined with flow control means so as to enable sufficiently accurate and repeatable doses to be dispensed. The device may be used to measure or dispense in absolute terms, e.g. in terms of specifically weighed doses, or in comparitive terms, e.g. doses or equal, but only approximately specific, weight.

The invention is concerned with the type of device in which material is caused to flow onto a metering element in such manner as to impose upon that element a force which is a function of the rate of mass flow of the material, the metering element being supported by means adapted to detect changes in at least a component of such force, thereby to provide a signal, (which may, for example, be in terms of an electrical impulse, a mechanical movement, or a pneumatic or hydraulic pressure), representing the rate of mass flow of material through the device.

It is recognised that for a device of this type to be able to afford consistently accurate and repeatable indications of rate of mass flow, and particularly to retain such accuracy and repeatability over a considerable range of such rates, it is important that the material flows onto the metering element in a well defined manner and from a condition in which the kinetic and potential energies of the material are established in repeatable fashion.

It is the primary aim of the present invention to provide a device in which these conditions can be met, and accordingly the invention provides a metering device of the type stated comprising an element adapted to be driven in rotation and means for supplying flowable material to such rotary element whereby material supplied to that element is centrifugally ejected therefrom when the element rotates, and baffle means disposed in the path of material ejected from the rotary element for intercepting such material and causing the same to flow by gravity onto the metering element.

In this way, the energy condition of each individual particle of material at the point where the particle is intercepted by the baffle means is established by the relative disposition of the baffle means and rotary element and the rotational speed of the latter, as is the distribution of material around the baffle means so that the path followed by the material flowing from the baffle means to the metering element is also established. These conditions will be repeatable for equal rates of mass flow of material and furthermore will be independent of the rate of mass flow of material supplied to the rotary element over a wide range of such rates so that a substantially linear response may be obtained from the metering element over this range.

The device may be so arranged that the force which is imposed upon the metering element by the material which is caused to flow thereonto is due predominantly to the absorption by the metering element of momentum from the material.

In such a case the baffle means may comprise a tubular skirt surrounding the rotary element, the metering element comprising a tube convergent in the direction of material flow disposed vertically below the skirt, (and either separate from the skirt or integral therewith), so as to provide an inclined surface for the impact of the material ejected from the rotary element and intercepted by the skirt.

However it is not necessary that such an arrangement prevails, it only being required that some force which is a function of the rate of mass flow of the material be imposed upon the metering element and it is also a feature of the invention that the device may be so arranged that the force which is imposed upon the metering element by the material which is caused to flow thereonto is due predominantly to friction between the material and the metering element. In such a case the baffle means may again comprise a tubular skirt surrounding the rotary element, the metering element comprising a tube disposed vertically below the skirt, (perhaps separate from though preferably integral with the skirt), so as to provide a surface in contact with which the material ejected from the rotary element and intercepted by the skirt can flow, a frictional 'drag' being imposed upon the surface by such flow.

In any case, the means by which the force imposed upon the metering element is to be detected will normally be required to be sensitive and of low inertial mass, and as far as possible to be friction-free; it is therefore preferred to support the metering element at the end of a resilient lever — or cantilever — like suspension so that the force which is imposed upon such element displaces the element, means being provided for detecting such displacement. Such a suspension will necessarily involve that the metering element moves arcuately (albeit through a very small distance) so it is contemplated that a relatively long arm will be used.

The displacement detecting means referred to above will preferably be an inductive or capacitative transducer having a high response rate per unit of positional displacement. However, other displacement detecting means may be used such as a pneumatic or hydraulic transducer, e.g. a very flexible metal bellows filled with gas or liquid and arranged to contract and expand with movement of the metering element so as to generate a fluid pressure signal indicative of the position thereof.

The 'rotary element' referred to herein is preferably a substantially horizontally aligned disc.

The device according to the invention may advantageously further comprise: means for controlling the rate of mass flow of material through the device in response to the signal which represents such rate; means for integrating said signal with respect to time, thereby to provide a second signal representing the total mass flow of material through the device; and means for controlling the flow of material through the device in response to said second signal, whereby successive measured doses of material can be dispensed from the device.

The invention will now be more particularly described, by way of example, with reference to the accompanying drawings, in which:

FIG. 1 is an elevational view, partly in section and partly schematic, of a first embodiment of the invention; and FIG. 2 is a similar view of a second embodiment of the invention.

In FIG. 1 a source of flowable material is indicated at 1, such as a hopper of particulate solid material or a tank or liquid. A feeding device 2 having an outlet at 2A is arranged to supply material from the source 1 to the rotary element described below, the particular form of the device 2 being chosen with regard to the type of material to be handled. Thus, in the case of free-running solids or non-adhesive liquids the feeding device may simply comprise a duct for the gravitational discharge of material, and having a variable gate, valve or other means of flow control as may be required; in the case of somewhat sticky or arching materials a more positive means of supply is required and the feeding device may accordingly comprise a tube within which a rotatable worm or screw helix is provided, which we shall term an auger; in the case of nonadhesive liquids a positive displacement pump may also be used as the feeding device.

The rotary element to which material from 1 is supplied comprises a disc 3 fast on a substantially vertically aligned spindle 4, adapted to be driven by any suitable motor means, the plane of the disc being transverse to the axis of the spindle, i.e. horizontal. The disc may have a slightly upturned peripheral lip if desired, as depicted at 3A in FIG. 1. Surrounding the disc and extending above its plane is a tubular skirt 5 fixed within an outer shell 6 which is continued downwards in convergent form to define the outlet of the device at 6A. Below the skirt 5 and within the outer shell is a convergent tubular metering element 7 which is supported by a pair of horizontally spaced brackets 8 of which one is shown in FIG. 1, the brackets in turn being carried at the ends of respective resilient cantilever arms 9 anchored at 9A. The suspension 8, 9 also carries the core 10A of an inductive or capacitative displacement transducer 10, employed to detect changes in the vertical position of element 7.

In operation, the source 1 is charged with material to be metered and feeding device 2 activated to deliver material onto the upper face of disc 3, which has been set spinning. From here the material is flung radially by centrifugal action to be intercepted by skirt 5, arresting the radial motion of the material. The material then falls, from a height which is very accurately defined by the spinning disc 3, until it impacts the wall of metering element 7. If necessary, the skirt 5 may be divergent in the direction of material flow or may be vibrated, to prevent material adhering to the skirt during its fall. By deflecting the material a component of momentum of the material is thus imposed as a vertical force upon the metering element, this force together with secondary vertical forces such as are due to the resident mass of material on the metering element, and the vertical component of the frictional forces between the material and metering element, resulting in a displacement of the metering element which is detected by the transducer 10. From element 7, the material falls through the outlet 6A whence it may be removed, as required, by any suitable means, again chosen with regard to the type of material concerned, such means being schematically depicted in FIG. 1 as a conveyor 11.

The displacement detected at 10 is a measure of the rate of mass flow of material passing through the device and the output from the transducer may be displayed by a suitably calibrated meter 12 to give a visual indication of this rate. Also, the transducer output may be integrated with time by an integrator 13 to result in a measure of total mass of material passed, for display by a meter 14. Furthermore, a controller 15 may be provided to which the transducer and/or integrator outputs are fed and which may be employed e.g. to control the rate of mass flow through the device by controlling the operation of the feeding device 2, or to perform other control functions based on the values of rate of mass flow or total mass experienced thereby.

Thus, for example, the controller 15 may be devised so as to interrupt the flow of material through the device whenever a specified total mass has been passed, irrespective of the rate, so that the device may be used as a dispenser of accurately determined and repeatable doses of material. Such flow interruption may be effected by controlling the operation of feeding device 2, or in certain cases simply by stopping the rotation of the disc 3. The latter method will be practical for example in cases where measured doses of solid material are to be supplied in succession to separate receptacles, rotation of the disc being stopped when the specified total mass of material has been passed, allowing material supplied continuously from device 2 to build up on the disc while a new receptacle is placed in position. Clearly if the device is to operate in this way the disc 3 must be of sufficient capacity to prevent material spilling over its edge during the time it is at rest, and such a method of operation will not of course be practical for the supply of liquids, a positive displacement pump controlled by the unit 15 being necessary in this case.

Turning now to FIG. 2 there is shown a similar device to that of FIG. 1 in which like parts are identified by the same reference numerals, the FIG. 2 device however depending upon frictional forces for the activation of its metering element. In this case the skirt 5 and metering element 7 of FIG. 1 are replaced by a single tubular element 16 supported in like manner to the metering element of FIG. 1. In operation of this device material is supplied to the disc 3 as before, to be arrested by element 16 when flung from the disc. The material impacts element 16 with no substantial vertical component of motion, and thus no substantial vertical component of force is imposed upon the element by virtue of this impact. The material then falls by gravity, from a height which is again very accurately defined by the spinning disc 3, in contact with the wall of element 16, in so doing imposing a frictional 'drag' upon that element in the vertical sense resulting in displacement of the element. The detection of this displacement and the manner in which it may be used to control the operation of the device corresponds exactly with the FIG. 1 case. It can also be mentioned here that the element 16 need not necessarily be of constant cross-section as shown in FIG. 2 but may be slightly convergent in the direction of material flow as indicated at 16A to ensure that contact is maintained between the element and the material during the latter's fall. The profile of the wall of such a convergent element 16 may be rectilinear, as illustrated, or may perhaps have a degree of concavity.

It is clear therefore, that the present invention may be performed with considerable variation as to construction. In particular the use of such terms as 'convergent' and 'tubular' in this Specification is to be noted, no explicit or implied limitation of the actual cross-sectional shape of parts such as 5, 6, 7 and 16 being made, since this is relatively unimportant. Thus, such parts may be circular in cross-section (so that element 7 would be frusto-conical), or of regular or irregular polygonal form, or indeed of any other form that may be desired.

Devices of any desired size or capacity may be provided according to the invention, varying from those capable of dispensing foodstuffs or the like in quantities in the order of a few grams, to those capable of handling mine or quarry products where rates of mass flow may be in the order of tons per second.

I claim:

1. A metering device for flowable materials comprising:

an element mounted for rotation about a substantially vertical axis;

means for supplying flowable material to said rotary element;

tubular baffle means surrounding said rotary element;

a convergent tubular metering element disposed beneath said baffle means;

means for rotating said rotary element at such speed that flowable material supplied thereto is centrifugally ejected therefrom and intercepted by said baffle means;

said baffle means and metering element being so disposed that substantially all of the material intercepted by the baffle means flows by gravity from its point of interception substantially vertically to the metering element and thereafter flows within the metering element, the material received by the metering element imposing thereupon a force which is a function of the rate of mass flow of the material; and said metering element being so configured that material can be received thereby from said baffle means around a continuous internal perimeter thereof; and means attached to said metering element externally thereof for supporting said element and detecting changes in at least a component of said force, thereby to provide a signal representing the rate of mass flow of material through the device.

2. A device according to claim 1 wherein said rotary element comprises a disc and said means for supplying flowable material has an outlet substantially coaxial with said disc and disposed to supply material to the upper surface of said disc, the diameter of said disc considerably exceeding the diameter of said outlet.

3. A device according to claim 2 further comprising means for integrating with respect to time said signal representing the rate of mass flow of material through the device, thereby to provide a second signal representing the total mass flow of material through the device, and means for stopping and starting the rotation of said disc in response to said second signal, thereby to dispense successive doses of material of equal mass from the device.

4. A device according to claim 1 wherein said metering element is convergent in the direction of material flow through the element and is so disposed that the material received thereby from said baffle means impacts the internal surface therefore so that the force which is imposed thereupon by said material is due predominantly to the absorption by the metering element of momentum from the material.

5. A device according to claim 1 wherein said metering element is so disposed that the material received thereby from said baffle means can gravitationally flow in contact with the internal surface thereof so that the force which is imposed thereupon by said material is due predominantly to friction between the material and the metering element.

6. A device according to claim 5 wherein said metering element is integral with said baffle means.

* * * * *